United States Patent [19]

Suzuki

[11] Patent Number: 4,457,394
[45] Date of Patent: Jul. 3, 1984

[54] FOUR-WHEEL DRIVE SYSTEM FOR AUTOMOTIVE VEHICLE

[75] Inventor: Kunihiko Suzuki, Yokohama, Japan
[73] Assignee: Nissan Motor Company, Limited, Yokohama, Japan
[21] Appl. No.: 380,701
[22] Filed: May 21, 1982
[30] Foreign Application Priority Data
Jul. 22, 1981 [JP] Japan ................ 56-114889
[51] Int. Cl.³ .......................... B60K 17/34
[52] U.S. Cl. ...................... 180/247; 74/695; 180/248; 180/297
[58] Field of Search ........... 180/297, 247, 248, 249, 180/250, 233; 74/665 GC, 665 GA, 665 GB, 665 H, 665 S, 665 T, 694, 695, 705, 758

[56] References Cited

U.S. PATENT DOCUMENTS

| | | | |
|---|---|---|---|
| 2,595,494 | 5/1952 | Stratman | 180/49 |
| 2,821,868 | 12/1963 | Gregory | 74/701 |
| 2,904,905 | 9/1959 | Armington | 37/126 |
| 3,350,960 | 11/1967 | Lamburn | 74/701 |
| 3,492,890 | 2/1970 | Hill et al. | 180/249 X |
| 3,557,634 | 1/1971 | Bixby | 74/710.5 |
| 3,580,350 | 5/1969 | Arkus-Duntov | 180/297 X |
| 4,074,591 | 2/1978 | Dick | 74/674 |
| 4,205,563 | 6/1980 | Gorrell | 74/758 X |
| 4,317,389 | 3/1982 | Falzoni | 74/689 |

FOREIGN PATENT DOCUMENTS 887849 1/1962 United Kingdom .
2074516 11/1981 United Kingdom ............ 180/249

Primary Examiner—Joseph F. Peters, Jr.
Assistant Examiner—D. Lynn Fugate
Attorney, Agent, or Firm—Lane, Aitken & Kananen

[57] ABSTRACT

A four-wheel drive system for a vehicle, comprising an engine having an output shaft rotatable about an axis in a lateral direction of the vehicle; a transmission gear unit including input and output shafts each having an axis of rotation parallel with the axis of rotation of the output shaft; a first wheel drive gear unit comprising power splitting gear means to split driving power from the transmission output shaft into two driving power components, and a first differential gear assembly for a pair of road wheels, the power splitting gear means and the first differential gear assembly being aligned with the transmission output shaft; and a second wheel drive gear unit comprising a second differential gear assembly for another pair of road wheels; the first wheel drive gear unit further comprising final reduction gear means positioned between the power splitting gear means and the first differential gear assembly, and power transfer gear means intervening between the power splitting gear means and the second wheel drive gear unit and comprising a driving bevel gear rotatable about an axis aligned with the axis of rotation of the transmission output shaft, the right-angle power transfer gear means comprising a driven bevel gear rotatable about an axis in a fore-and-aft direction of the vehicle body and held in mesh with the driving bevel gear.

28 Claims, 9 Drawing Figures

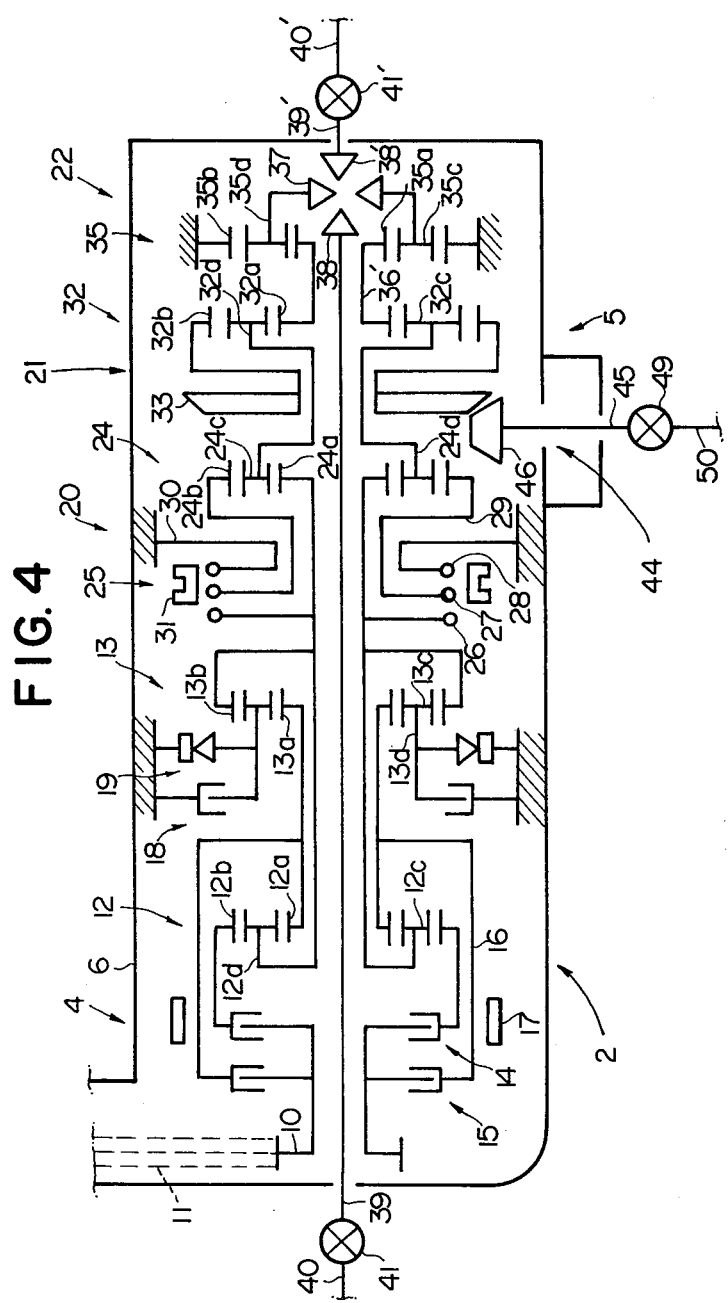

4,457,394

FOUR-WHEEL DRIVE SYSTEM FOR AUTOMOTIVE VEHICLE

FIELD OF THE INVENTION

The present invention relates to a four-wheel drive system for a vehicle having at least two pairs of road wheels consisting of a pair of front road wheels and a pair of rear road wheels and, more particularly, to a four-wheel drive system for such a wheeled vehicle.

SUMMARY OF THE INVENTION

In accordance with the present invention, there is provided a four-wheel drive system for a vehicle having at least two pairs of road wheels consisting of a pair of front road wheels and a pair of rear road wheels, comprising a power unit having an output shaft rotatable about an axis in a lateral direction of the vehicle; a power transmission gear unit including transmission input and output shafts each having an axis of rotation parallel with the axis of rotation of the output shaft of the power unit, and gears mounted on the transmission input and output shafts and arranged to be capable of selectively producing a plurality of ratios between the speeds of rotation of the transmission input and output shaft; a first wheel drive gear unit comprising power splitting gear means operative to split driving power from the transmission output shaft into first and second driving power components, and a first differential gear assembly including gears arranged to split the first driving power component into two output power components to be respectively transmitted to one of the two pairs of road wheels, the power splitting gear means and the first differential gear assembly being positioned in alignment with the transmission output shaft in a lateral direction of the vehicle; and a second wheel drive gear unit comprising a second differential gear assembly including gears arranged to split the second driving power component into two output power components to be respectively transmitted to the other of the two pairs of road wheels; wherein the first wheel drive gear unit further comprises final reduction gear means positioned axially between the power splitting gear means and the first differential gear assembly, and power transfer gear means intervening between the power splitting gear means and the second wheel drive gear unit and operative to transmit therethrough the second driving power component to the second differential gear assembly, the power splitting gear means comprising a driving power transfer bevel gear rotatable about an axis aligned with the axis of rotation of the transmission output shaft, the power transfer gear means comprising a driven power transfer bevel gear which is rotatable about an axis in a fore-and-aft direction of the vehicle body and which is held in mesh with the driving power transfer bevel gear.

DESCRIPTION OF THE DRAWINGS

The features and advantages of the four-wheel drive system according to the present invention will be more clearly understood from the following description taken in conjunction with the accompanying drawings in which like reference numerals and characters designate corresponding or similar members, elements and units throughout the figures and in which:

FIG. 4 is a schematic view showing the front-wheel drive gear unit forming part of a second preferred embodiment of a four-wheel drive system according to the present invention;

DESCRIPTION OF THE EMBODIMENTS

Description will be hereinafter made in connection with the embodiments of a four-wheel drive system according to the present invention.

Figure 1:
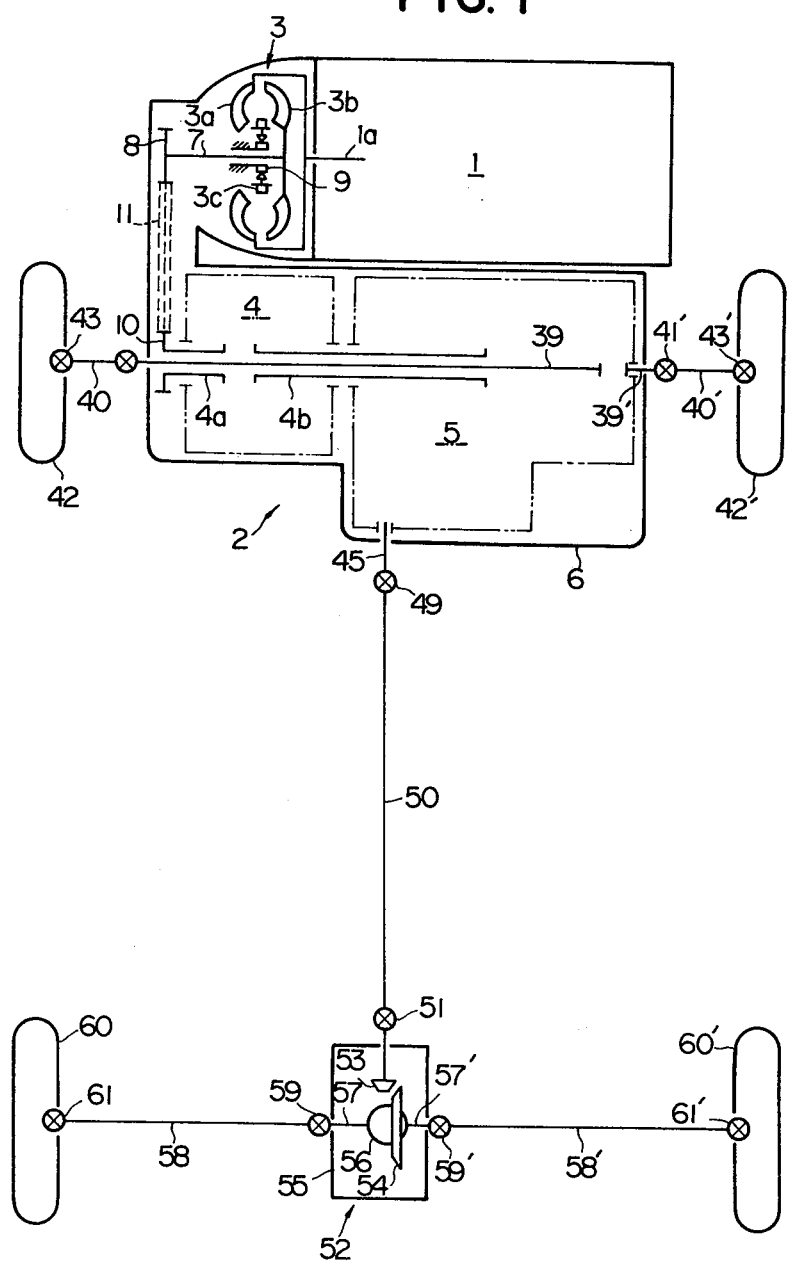
FIG. 1 is a schematic view showing the general construction and arrangement of each of preferred embodiments of a four-wheel drive system according to the present invention.

Referring to FIG. 1, the four-wheel drive system embodying the present invention comprises a power unit constituted by, for example, an internal combustion engine 1 having an output shaft 1a. The four-wheel drive system proposed by the present invention features the crosswise-positioned engine arrangement and, thus, the engine 1 is installed on the body structure (not shown) of a wheeled vehicle in such a manner that the output shaft 1a extends in a lateral direction of the vehicle body. Furthermore, the four-wheel drive system embodying the present invention is assumed, by way of example, as being of the front-engine design having the engine 1 positioned on a front portion of the vehicle body.

The four-wheel drive system embodying the present invention further comprises an automatically operated transmission-front-axle or, briefly, transaxle mechanism 2. The transaxle mechanism 2 largely consists of a clutch unit 3 and a power transmission gear unit 4, and a front-wheel drive gear unit 5. The clutch unit 3, transmission gear unit 4 and front-wheel drive gear unit 5 are enclosed within a transaxle casing structure 6 juxtaposed with respect to the engine 1. The clutch unit 3 is herein assumed, by way of example, as being composed of a three-member torque converter and is thus shown comprising a driving member or pump impeller 3a, a driven member or turbine runner 3b, and a reaction member or a stator 3c. The pump impeller 3a is connected to the output shaft 1a of the engine 1 and is rotatable with the engine output shaft 1a about an axis aligned with the axis of rotation of the shaft 1a. The turbine runner 3b is connected to, and rotatable with, a torque converter output shaft 7, aligned with the engine output shaft 1a and having carried thereon a driving sprocket wheel 8. The stator 3c is positioned axially between the pump impeller 3a and the turbine runner 3b and is connected to the transaxle casing structure 6 via a one-way clutch assembly 9. On the other hand, the power transmission gear unit 4 has hollow transmission input and output shafts 4a and 4b extending in alignment with each other and in parallel with the aligned axes of rotation of the engine output shaft 1a and the torque converter output shaft 7. The transmission input shaft 4a has carried thereon a driven sprocket wheel 10 aligned with the driving sprocket wheel 8 on the torque converter output shaft 7 in a fore-and-aft direction of the vehicle body. As indicated by broken lines in FIG. 1, an endless chain 11 is passed between the sprocket wheels 8 and 10.

Figure 2:
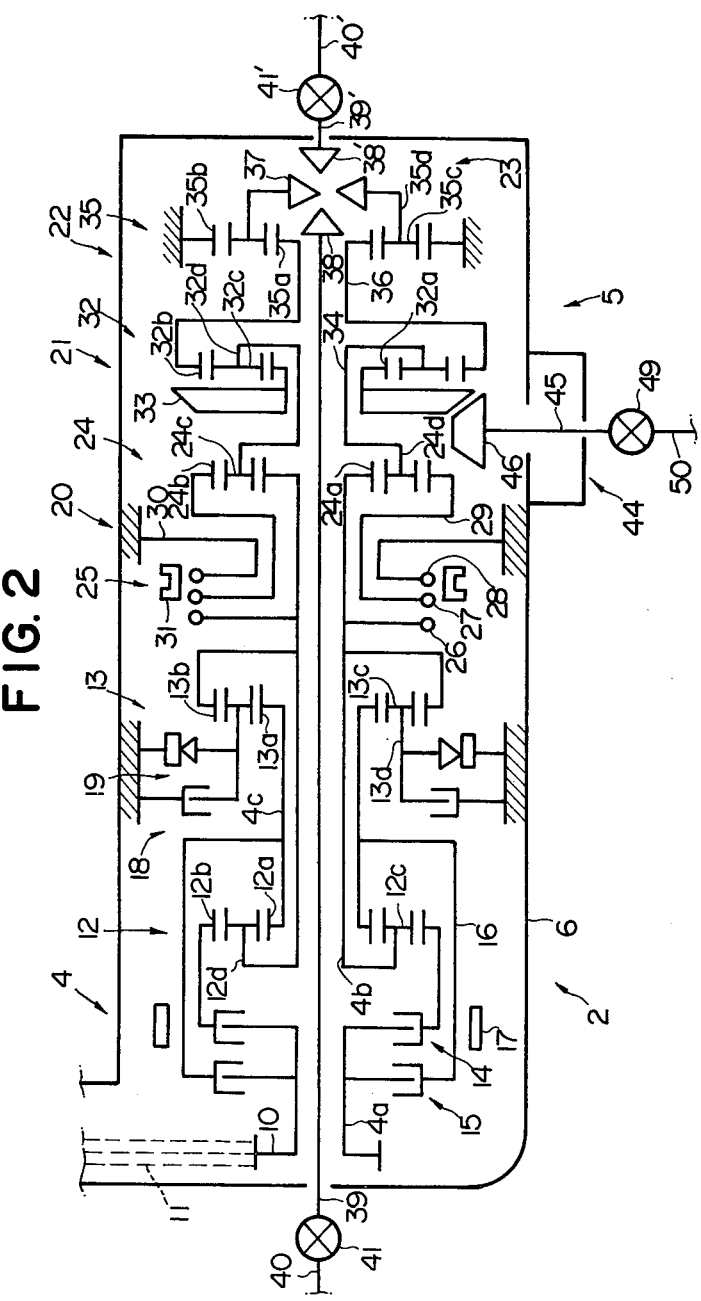
FIG. 2 is a schematic view showing the front-wheel drive gear unit forming part of a first preferred embodiment of a four-wheel drive system according to the present invention.

The construction and arrangement of the transaxle mechanism 2 of a first preferred embodiment of the four-wheel drive system thus constructed generally is shown in FIG. 2. In FIG. 2, the transmission gear unit 4 is further shown having a hollow transmission intermediate shaft 4c coaxially surrounding an intermediate axial portion of the transmission output shaft 4b as shown. The transmission gear unit 4 in the embodiment herein shown is assumed, by way of example, as being of the three-forward-speed and one-reverse-speed type and comprises two planetary gear assemblies arranged in series with each other coaxially on the transmission intermediate shaft 4c. The planetary gear assemblies of the transmission gear unit 4 consist of a first planetary gear assembly 12 and a second planetary gear assembly 13. The first planetary gear assembly 12 comprises an externally toothed sun gear 12a rotatable on the transmission intermediate shaft 4c, an internally toothed ring gear 12b coaxially surrounding the sun gear 12a, and at least two planet pinions 12c each held in mesh with the sun gear 12a and ring gear 12b. Similarly, the second planetary gear assembly 13 comprises an externally toothed sun gear 13a rotatable on the transmission intermediate shaft 4c, an internally toothed ring gear 13b coaxially surrounding the sun gear 13a, and at least two plant pinions 13c each held in mesh with the sun gear 13a and ring gear 13b. The respective sun gears 12a and 13a of the first and second planetary gear assemblies 12 and 13 are splined or otherwise connected to the hollow intermediate shaft 4c and are thus rotatable therewith. The planet pinions 12c of the first planetary gear assembly 12 are jointly connected to a first pinion carrier 12d rotatable about the common axis of rotation of the sun and ring gears 12a and 12b and, likewise, the planet pinions 13c of the second planetary gear assembly 13 are jointly connected to a second pinion carrier 13d rotatable about the common axis of rotation of the sun and ring gears 13a and 13b. The planet pinions of each planetary gear assembly are, thus, not only rotatable individually with respect to the associated pinion carrier 12d about respective axes parallel with the common axis of rotation of the sun and ring gears 12a and 12b of the planetary gear assembly 12 but also are revolvable together with the associated pinion carrier 12d about the common axis of rotation of the sun and ring gears 12a and 12b. The pinion carrier 12d of the first planetary gear assembly 12 and the ring gear 13b of the second planetary gear assembly 13 are jointly connected to and rotatable with the transmission output shaft 4b.

The power transmission gear unit 4 further comprises two transmission clutch assemblies which are positioned in series with each other coaxially around the hollow transmission input shaft 4a. The transmission clutch assemblies consist of a forward-drive clutch assembly 14 to be actuated to select any of the first, second and third forward drive gear ratios, and a high-and-reverse clutch assembly 15 to be actuated to select the third forward drive gear ratio or the reverse drive gear ratio. The forward-drive clutch assembly 14 has input members rotatable with the transmission input shaft 4a, and output members rotatable with the ring gear 12b of the first planetary gear assembly 12. On the other hand, the high-and reverse clutch assembly 15 has input members rotatable with the transmission input shaft 4a, and an output member connected to the transmission intermediate shaft 4c and accordingly rotatable with the respective sun gears 12a and 13a of the first and second planetary gear assemblies 12 and 13 through a clutch drum 16. The clutch drum 16 is coaxially surrounded by a second-speed brake band 17 which is actuated to brake the drum 16 and accordingly the sun gears 12a and 13a for selecting the second forward drive gear ratio.

The transmission gear unit 4 further comprises a low-and-reverse brake assembly 18 having stationary members secured to the transaxle casing structure 6, and rotatable members rotatable with the pinion carrier 13d of the second planetary gear assembly 13. The low-and-reverse brake assembly 18 is adapted to select the first forward drive gear ratio or the reverse drive gear ratio and is associated with a one-way clutch assembly 19 which comprises a stationary outer race member secured to the transaxle casing structure 6, and a rotatable inner race member connected to and rotatable with the pinion carrier 13d of the second planetary gear assembly 13 and the rotatable members or brake discs of the low-and-reverse brake assembly 18. The one-way clutch assembly 19 is operative to permit the rotatable inner race member thereof to rotate about the axis of rotation of the transmission output shaft 4b only in a forward direction identical with the direction of rotation of the transmission input shaft 4a.

The clutch assemblies 14 and 15, brake band 17 and brake assembly 18 included in the above described transmission gear unit 4 are actuated hydraulically by the fluid pressure selectively distributed thereto through and under the control of a hydraulic control system (not shown). Thus, any of the three forward drive gear ratios and one reverse drive gear ratio is produced between the transmission input and output shafts 4a and 4b when any two of these clutch and brake assemblies and the one-way clutch assembly 19 are brought into operation. The construction and arrangement of each of the torque converter 3 and the transmission gear unit 4 as hereinbefore described is simply by way of example and may be modified and/or changed in numerous manners as desired. The transmission output shaft 4b is shown having an axial extension extending opposite to the transmission input shaft 4a.

The front-wheel drive gear unit 5 largely consists of low-and-high speed shift means 20, power splitting gear means 21 and front-wheel final reduction gear means 22, which are also enclosed within the transaxle casing structure 6 and which are arranged in series between the transmission gear unit 4 and a front-wheel differential gear assembly 23 which also forms part of the front-wheel drive gear unit 5.

The low-and-high speed shift means 20 in turn largely consists of a speed-shift planetary gear assembly 24 and a low-and-high speed shifting clutch mechanism 25 which are positioned coaxially around the above mentioned axial extension of the transmission output shaft 4b. The speed-shift planetary gear assembly 24 is per se constructed similarly to each of the planetary gear assemblies 12 and 13 of the transmission gear unit 4 and comprises an externally toothed sun gear 24a, an internally toothed ring gear 24b coaxially encircling the sun gear 24a and two or more planet pinions 24c each intervening between the sun gear 24a and the ring gear 24b. The sun gear 24a is splined or otherwise connected to the axial extension of the transmission output shaft 4b and is rotatable about an axis coincident with the axis of rotation of the shaft 4b. Each of the planet pinions 24c is rotatable about an axis parallel with the axis of rotation of the sun gear 24a and is held in mesh with both of the sun gear 24a and the ring gear 24b. The planet pinions 24c are connected together by a pinion carrier 24d rotatable about the common axis of rotation of the sun and ring gears 24a and 24b and are, thus, not only rotatable individually with respect to the pinion carrier 24d about their respective axes of rotation but revolvable together with the pinion carrier 24d about the common axis of rotation of the sun gear 24a and the ring gear 24b. The ring gear 24b is rotatably supported on the transaxle casing structure 6 by suitable bearings (not shown).

The low-and-high speed shifting clutch mechanism 25 is adapted to have the ring gear 24b of the planetary gear assembly 24 coupled selectively to the sun gear 24a and accordingly to the transmission output shaft 4b or to the transaxle casing structure 6. The clutch mechanism 25 to achieve such an end comprises externally toothed or serrated first, and second and third speed-shift clutch gears 26, 27 and 28 which are axially arranged in series with each other with the second speed-shift clutch gear 27 positioned intermediate between the first and third clutch gears 26 and 28. The first speed-shift clutch gear 26 is fixedly mounted on the axial extension of the transmission output shaft 4b and is coaxially rotatable with the transmission output shaft 4b and accordingly with the sun gear 24a of the planetary gear assembly 24. The second speed-shift clutch gear 27 is fixedly mounted on or integral with a hollow connecting member 29 which is securely connected to or integral with the ring gear 24b of the planetary gear assembly 24. The second speed-shift clutch gear 27 is thus coaxially rotatable with the ring gear 24b through the hollow connecting member 29 which is arranged in coaxially surrounding relationship to an axial portion of the extension of the transmission output shaft 4b. On the other hand, the third speed-shift clutch gear 28 is fixedly connected to or integral with the transaxle casing structure 6 by an annular connecting member 30 coaxially surrounding an axial portion of the connecting member 29. The first, second and third speed-shift clutch gears 26, 27 and 28 thus arranged are axially spaced apart from each other and have equal outside diameters.

Figure 3A:
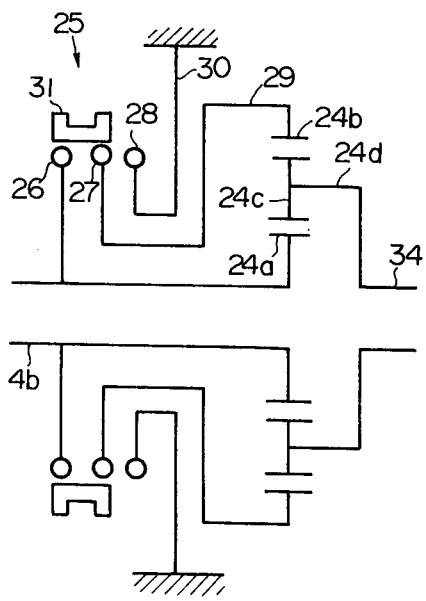
FIG. 3A is a schematic view showing the low-and-high speed shifting means in one operative condition of the embodiment illustrated in FIG. 2.
Figure 3B:
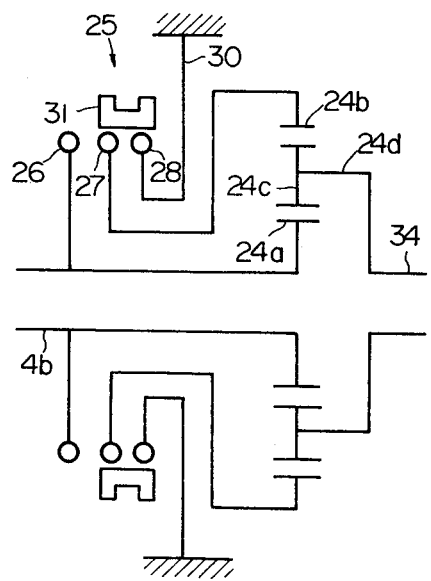
FIG. 3B is a schematic view showing the low-and-high speed shifting means in another operative condition of the embodiment illustrated in FIG. 2.

The low-and-high speed shifting clutch mechanism 25 further comprises an internally toothed or serrated annular coupling sleeve 31 which is constantly held in mesh with the second speed-shift clutch gear 27 located between the first and third speed-shift clutch gears 26 and 28. The coupling sleeve 31 is axially movable selectively into and out of a first axial position in engagement with both of the first and second speed-shift clutch gears 26 and 27 as shown in FIG. 3A and a second axial position in engagement with both of the second and third speed-shift clutch gears 27 and 28 as shown in FIG. 3B of the drawings. As will be understood from the foregoing description, the planetary gear assembly 24 of the low-and-high speed shift means 20 has a constant input member constituted by the sun gear 24a, a lockable input member constituted by the ring gear 24b thereof, and an output member constituted by the pinion carrier 24d thereof.

On the other hand, the power splitting gear means 21 of the front-wheel drive gear unit 5 is positioned axially intermediate between the speed-shift planetary gear assembly 24 and the previously mentioned front-wheel differential gear assembly 23 and consists of a differential-action planetary gear assembly 32 and a driving power transfer bevel gear 33. The differential-action planetary gear assembly 32 is per se constructed similar to the planetary gear assembly 24 of the low-and-high speed shifting means 20 and comprises an externally toothed sun gear 32a, an internally toothed ring gear 32b coaxially encircling the sun gear 32a and two or more planet pinions 32c each intervening between the sun gear 32a and the ring gear 32b. The sun gear 32a is rotatable about an axis aligned with the axis of rotation of the sun gear 24a of the planetary gear assembly 24. Each of the planet pinions 32c is rotatable about an axis parallel with the axis of rotation of the sun gear 32a and is held in mesh with both of the sun gear 32a and the ring gear 32b. The planet pinions 32c are connected together by a pinion carrier 32d and are, thus, not only rotatable individually with respect to the pinion carrier 32d about their respective axes of rotation but also are revolvable together with the pinion carrier 32d about the common axis of rotation of the sun gear 32a and the ring gear 32b. The pinion carrier 32d is connected to the pinion carrier 24d, viz., the output member of the planetary gear assembly 24 by a hollow connecting member 34 axially aligned with the transmission output shaft 4b as shown. The planetary gear assembly 32 of the power splitting gear means 21 constructed and arranged as above described has an input member constituted by the pinion carrier 32d thereof and two output members constituted by the sun and ring gears 32a and 32b, respectively, thereof. The sun gear 32a thus constituting one of the two output members of the planetary gear assembly 32 is connected to or integral with and accordingly rotatable with the driving power transfer bevel gear 33 also forming part of the power splitting gear means 21. The other output member constituted by the ring gear 32b of the planetary gear assembly 32 is drivingly connected to the previously mentioned front-wheel final reduction gear means 22.

The front-wheel final reduction gear means 22 is positioned axially intermediate between the planetary gear assembly 32 of the above described power splitting gear means 21 and the previously mentioned front-wheel differential gear assembly 23 and is constituted by a final-reduction planetary gear assembly 35 which per se is also constructed similarly to the planetary gear assembly 24 of the low-and-high speed shift means 20. Thus, the final-reduction planetary gear assembly 35 comprises an externally toothed sun gear 35a, an internally toothed ring gear 35b coaxially encircling the sun gear 35a and two or more planet pinions 35c each intervening between the sun gear 35a and the ring gear 35b. The sun gear 35a is rotatable about an axis also aligned with the axis of rotation of the sun gear 24a of the planetary gear assembly 24 of the low-and-high speed shift means 20. Each of the planet pinions 35c is rotatable about an axis parallel with the axis of rotation of the sun gear 35a and is held in mesh with both of the sun gear 35a and the ring gear 35b. The planet pinions 35c are connected together by a pinion carrier 35d and are, thus, not only rotatable with respect to the pinion carrier 35d about their respective axes of rotation but also are revolvable together with the pinion carrier 35d about the common axis of rotation of the sun gear 35a and the ring gear 35b. The ring gear 35b is securely connected to the transaxle casing structure 6 by means of a suitable annular connecting member as shown. The sun gear 35a of the planetary gear assembly 35 thus constructed and arranged is connected to the ring gear 32b, viz., the output member of the differential-action planetary gear assembly 32 by a hollow connecting member 36 axially aligned with the connecting member 34 and accordingly with the transmission output shaft 4b. The sun gear 35a is, thus, rotatable with the ring gear 32b of the planetary gear assembly 32 and constitutes an input member of the planetary gear assembly 35 while the pinion carrier 35d constitutes an output member of the planetary gear assembly 35. If desired, however, such a front-wheel final reduction gear means 22 may be modified so that the planetary gear assembly 35 thereof has an input member constituted by one of the ring gear 35b and the pinion carrier 35d, and an output member constituted by one of the sun and ring gears 35a and 35b, respectively.

In the front-wheel drive gear unit 5 constructed and arranged as above described, the driving power transmitted from the pinion carrier 24d of the planetary gear assembly 24 to the pinion carrier 32d of the differential-action planetary gear assembly 32 is split into two driving power components. One of these two power components is transmitted through the ring gear 32b of the planetary gear assembly 32 to the final-reduction planetary gear assembly 35 and the other of the power components is transmitted via the sun gear 32a of the planetary gear assembly 32 to the driving power transfer bevel gear 33. The driving power component transmitted to the sun gear 35a, viz., the input member of the planetary gear assembly 35 in turn is carried through the pinion carrier 35d, viz., the output member of the planetary gear assembly 35 to the front-wheel differential gear assembly 23.

The front-wheel differential gear assembly 23 comprises a pair of bevel pinions 37 jointly housed in a differential gear casing (not shown). The differential gear casing and accordingly the bevel pinions 37 are rotatable together about an axis aligned with the axis of rotation of the transmission output shaft 4b. The bevel pinions 37 are further rotatable on a common pinion cross shaft (not shown) having a center axis directed at right angles to the axis of rotation of the differential gear casing. Thus, the bevel pinions 37 are rotatable not only together with the differential gear casing about the axis of rotation of the casing but independently of each other with respect to the gear casing about an axis perpendicular to the axis of rotation of the gear casing. The differential gear casing having the bevel pinions 37 thus arranged therein is connected to and rotatable with the pinion carrier 35d, viz., the output member of the final-reduction planetary gear assembly 35. The differential bevel pinions 37 intervene between and are held in mesh with a pair of differential side bevel gears 38 and 38' which are also carried in the above mentioned differential gear casing and which are rotatable about the axis of rotation of the gear casing. The side bevel gears 38 and 38' are splined to inner end portions of a pair of side gear shafts 39 and 39', respectively, extending into the gear casing in a lateral direction of the vehicle body. One of the side gear shafts such as the side gear shaft 39 carrying the side bevel gear 38 as shown axially extends in part through each of the hollow connecting members 36 and 34 and in part through each of the hollow transmission output and input shafts 4b and 4a as shown. The other side gear shaft 39' carrying the side bevel gear 38' axially extends outwardly from the differential gear casing in the opposite direction to the side gear shaft 39. The side gear shafts 39 and 39' form part of front axle assemblies which further comprise front wheel drive shafts 40 and 40' connected to the side gear shafts 39 and 39' through suitable coupling means such as constant-velocity joints 41 and 41', respectively. The front wheel drive shafts 40 and 40' in turn extend outwardly from the constant-velocity joints 41 and 41' in a lateral direction of the vehicle body and are connected at their outer axial ends to the front wheel axles for front road wheels 42 and 42' through suitable coupling means such as constant-velocity joints 43 and 43', respectively.

The driving power transmitted from one output member, viz., the ring gear 32b of the differential-action planetary gear assembly 32 to the front-wheel differential gear assembly 23 by way of the final-reduction planetary gear assembly 35 is thus further split by the front-wheel differential gear assembly 23 into two output power components to be transmitted to the front road wheels 42 and 42'. The driving power component transmitted from the other output member, viz., the sun gear 32a of the planetary gear assembly 32 to the driving power transfer bevel gear 33 is carried to a rear-wheel driveline through power transfer gear means 44 which also forms part of the front-wheel drive gear unit 5. The power transfer gear means 44 is adapted to convert the rotation of the driving power transfer bevel gear 33 into rotation about an axis perpendicular in intersecting or non-intersecting relationship to the axis of rotation of the power transfer bevel gear 33 and is enclosed within a rearward extension of the transaxle casing structure 6.

The power transfer gear means 44 comprises a power transfer shaft 45 extending at right angles to the side gear shaft 39, viz., in a fore-and-aft direction of the vehicle body and having axial portions journaled in suitable bearings (not shown) received in the transaxle casing structure 6. The power transfer shaft 45 has mounted thereon a driven power transfer bevel gear 46 rotatable with the shaft 45. The driven power transfer bevel gear 46 is held in mesh with the driving power transfer bevel gear 33 and is driven for rotation about the axis of rotation of the power transfer shaft 45, viz., about an axis at right angles, either in intersecting or non-intersecting relationship, to the axis of rotation of the driving power transfer bevel gear 33 when the gear 33 is driven by the sun gear 32a of the planetary gear assembly 32. The power transfer shaft 45 projects rearwardly from the rearward extension of the casing structure 6 through an opening formed in the rearward extension and is connected through suitable coupling means such as a universal joint 49 to a propeller shaft 50 extending rearwardly from the universal joint 49 in a fore-and-aft direction of the vehicle body as shown in FIG. 1. The propeller shaft 50 forms part of the previously mentioned rear-wheel driveline and is rearwardly connected through suitable coupling means such as a universal joint 51 to a rear-wheel final reduction gear unit 52. The rear-wheel final reduction gear unit 52 comprises a driving bevel pinion 53 connected to the propeller shaft 50 through the universal joint 51 and having an axis of rotation in a fore-and-aft direction of the vehicle body. The driving bevel pinion 53 is held in mesh with a bevel ring gear 54 having an axis of rotation at right angles to the axis of rotation of the driving bevel pinion 53. The driving bevel pinion 53 and the bevel ring gear 54 constitute, in combination, power transfer gear means adapted to convert the rotation of the propeller shaft 50 about the axis of rotation thereof into rotation of the bevel ring gear 54 about an axis perpendicular, in intersecting or non-intersecting relationship, to the axis of rotation of the propeller shaft 50. The bevel pinion 53 and bevel ring gear 54 are housed in a stationary gear casing 55 and are each journaled in suitable bearings (not shown) received in the gear casing 55.

Similarly to the previously described front-wheel drive gear unit 5, the rear-wheel final reduction gear unit 52 further includes a differential gear assembly schematically indicated at 56. The rear-wheel differential gear assembly 56 is constructed similarly to the previously described front-wheel differential gear assembly 23 and comprises, though not shown in the drawings, a differential gear casing rotatable with the bevel ring gear 54 about an axis parallel with the axis of rotation of the ring gear 54 with respect to the stationary gear casing 55. The differential gear casing has carried therein a pair of differential bevel pinions and a pair of differential side bevel gears which are rotatable about aligned axes parallel with the axis of rotation of the ring gear 54. The side bevel gears are splined to inner end portions of a pair of side gear shafts 57 and 57', respectively, which extend from the stationary gear casing 55 in a lateral direction of the vehicle body. The side gear shafts 57 and 57' form part of rear axle assemblies which further comprise rear wheel drive shafts 58 and 58' connected to the side gear shafts 57 and 57' through suitable coupling means such as constant-velocity joints 59 and 59', respectively. The rear wheel drive shafts 58 and 58' in turn extend outwardly from the constant-velocity joints 59 and 59' in a lateral direction of the vehicle body and are connected at their outer axial ends to the wheel axles of rear road wheels 60 and 60' through suitable coupling means such as constant-velocity joints 61 and 61', respectively.

Description will be hereinafter made regarding the operation of the four-wheel drive system constructed and arranged as hereinbefore described with reference to FIGS. 1, 2, 3A and 3B.

When the engine 1 is in operation, the driving power delivered from the output shaft 1a thereof is transmitted via the torque converter 3 to the input shaft 4a of the power transmission gear unit 4 through the sprocket wheel 8 on the converter output shaft 7, the endless chain 11 and the sprocket wheel 10 on the transmission input shaft 4a. If, under these conditions, any two of the clutch assemblies 14 and 15, brake band 17 and brake assembly 18 of the transmission gear unit 4 are held in operative conditions with the respective servo means actuated hydraulically, one of the first, second and third forward drive gear ratios or the reverse drive gear ratio is established between the transmission input and output shafts 4a and 4b. The driving power transmitted through the torque converter 3 to the transmission input shaft 4a is carried to the transmission output shaft 4b through the pinion carrier 12d of the first planetary gear assembly 12 or the ring gear 13b of the second planetary gear assembly 13 to the transmission output shaft 4b at a speed proportioned to the selected gear ratio. The rotation of the transmission output shaft 4b is transmitted direct to the sun gear 24a of the speed-shift planetary gear assembly 24 and causes the sun gear 24a to rotate about the common axis of rotation of the sun and ring gears 24a and 24b of the planetary gear assembly 24.

If, in this instance, the low-and-high speed shifting clutch mechanism 25 is held in a condition having the coupling sleeve 31 moved into the first axial position engaging both of the first and second speed-shift clutch gears 26 and 27 as shown in FIG. 3A, driving power is transmitted from the transmission output shaft 4b not only to the sun gear 24a of the planetary gear assembly 24 but also to the ring gear 24b of the planetary planetary gear assembly 24 through the first speed-shift clutch gear 26, coupling sleeve 31, second speed-shift clutch gear 27 and connecting member 29. As a consequence, both of the sun and ring gears 24a and 24b of the planetary gear assembly 24 are driven to rotate at equal speeds about the common axis of rotation of the gears 24a and 24b, with the result that all the rotatable members of the planetary gear assembly 24 are caused to rotate as a single unit about the common axis of rotation of the gears 24a and 24b. It therefore follows that the driving power transmitted to the transmission output shaft 4b as above described is carried without reduction in speed of rotation to the pinion carrier 24d of the planetary gear assembly 24 and through the pinion carrier 24d to the pinion carrier 32d of the differential-action planetary gear assembly 32 and thereby causes the pinion carrier 32d to rotate with the planet pinions 32c about the common axis of rotation of the sun and ring gears 32a and 32b of the planetary gear assembly 32.

If, on the other hand, the low-and-high speed shifting clutch mechanism 25 is maintained in a condition having the coupling sleeve 31 held in the second axial position engaging the second and third speed-shift clutch gears 27 and 28 as shown in FIG. 3B, then the ring gear 24b of the planetary gear assembly 24 is fixed with respect to the transaxle casing structure 6 through the second speed-shift clutch gear 27, coupling sleeve 31, the third speed-shift clutch gear 28 and the connecting member 30, and thus serves as a reaction member in the planetary gear assembly 24. Under these conditions, the rotation of the sun gear 24a rotating together with the transmission output shaft 4b is transmitted to the pinion carrier 24d of the planetary gear assembly 24 and accordingly to the pinion carrier 32d of the differential-action planetary gear assembly 32 at a speed proportional to and lower than the revolution speed of the transmission output shaft 4b. Driving power is thus transmitted from the transmission output shaft 4b to the pinion carrier 32d of the planetary gear assembly 32 selectively with or without reduction in speed of rotation depending upon the axial position of the coupling sleeve 31 with respect to the first and third speed-shift clutch gears 26 and 28 of the low-and-high speed shifting clutch mechanism 25.

The driving power transmitted to the pinion carrier 32d of the differential-action planetary gear assembly 32 as hereinbefore discussed is split into two driving power components respectively driving the sun gear 32a and the ring gear 32b of the planetary gear assembly 32 for rotation about the common axis of rotation thereof at different speeds. The driving power thus transmitted to the ring gear 32b is carried to the sun gear 35a of the final-reduction planetary gear assembly 35 and further through the pinion carrier 35d of the gear assembly 35 to the differential gear casing of the front-wheel differential gear assembly 23. The bevel pinions 37 of the gear assembly 23 are thus driven for rotation together with the differential gear casing about an axis aligned with the axis of rotation of the transmission output shaft 4b while individually rotating about their respective axes of rotation perpendicular to the axis of rotation of the gear casing. The bevel pinions 37, in turn, drive the differential side bevel gears 38 and 38' for rotation with respect to the gear casing about their axes of rotation aligned with the axis of rotation of the transmission output shaft 4b. It therefore follows that the driving power transmitted to the front-wheel differential gear assembly 23 is further split into two output components with different speeds by means of the gear assembly 23. The two output power components are respectively transmitted through the side gear shafts 39 and 39', the constant-velocity joints 41 and 41', the front wheel drive shafts 40 and 40', and the constant-velocity joints 43 and 43' to the front wheel axles for the front road wheels 42 and 42', respectively.

On the other hand, the driving power transmitted from the pinion carrier 32d to the sun gear 32a of the planetary gear assembly 32 is transmitted to the driving power transfer bevel gear 33 and further through the bevel gear 33 to the driven power transfer bevel gear 46 of the power transfer gear means 44. The driven power transfer bevel gear 46 on the power transfer shaft 45 is thus caused to turn about its axis of rotation in a fore-and-aft direction of the vehicle body. Referring back to FIG. 1, the rotation of the transfer shaft 45 is transmitted by way of the universal joint 49, propeller shaft 50 and universal joint 51 to the driving bevel pinion 53 and further through the driving bevel pinion 53 to the bevel ring gear 54 of the rear-wheel final reduction gear unit 52. The driving power thus transmitted to the rear-wheel final reduction gear unit 52 is carried via the differential gear casing and the cross shaft of the rear-wheel differential gear assembly 56 to the differential bevel pinions and accordingly to the differential side bevel gears of the gear assembly 56 for rotation with respect to the differential gear casing. The driving power transmitted to the final reduction gear unit 52 is in this manner also further split by the gear assembly 56 into two output power components with different speeds. The two output power components thus delivered from the rear-wheel final reduction gear unit 52 are transmitted through the side gear shafts 57 and 57', the constant-velocity joints 59 and 59', the rear wheel drive shafts 58 and 58' and the constant-velocity joints 61 and 61' to the rear wheel axles for the rear road wheels 60 and 60', respectively.

In the four-wheel drive system embodying the present invention as hereinbefore described, the low-and-high speed shift means 20 is arranged so that the planetary gear assembly 24 thereof has an output member constituted by the pinion carrier 24d thereof and a constant input member constituted by the sun gear 24a or the combination of the sun and ring gears 24a and 24b. If desired, however, such a low-and-high speed shift means 20 may be modified so that the planetary gear assembly 24 thereof has an output member constituted by the sun gear 24a thereof, a constant input member connecting to the transmission output shaft 4b constituted by the pinion carrier 24d and a lockable input member connecting to the second speed-shift clutch gear 27 constituted by the ring gear 24b.

The embodiment including a transaxle mechanism 2 shown in FIG. 4 is characterized by modified arrangement of the power splitting gear means 21 in the front-wheel drive gear unit 5. In the modified form of power splitting gear means 21, the planetary gear assembly 32 has its sun gear 32a connected to the sun gear 35a of the final-reduction planetary gear assembly 35 by means of a hollow connecting member 36' and its pinion carrier 32d connected direct to the pinion carrier 24d of the speed-shift planetary gear assembly 24. Furthermore, the ring gear 32b of the planetary gear assembly 32 is securely connected to or integral with a driving power transfer bevel gear 33 which is thus rotatable about an axis coincident with an extension of the common axis of rotation of the sun gear 32a and ring gear 32b of the planetary gear assembly 32. The driven power transfer bevel gear 46 on the power transfer shaft 45 of the power transfer means 44 is held in mesh with the driving power transfer bevel gear 33 thus rotatable with the ring gear 32b. The four-wheel drive system including the power splitting gear means 21 shown in FIG. 4 is in other respects entirely similar to the transaxle mechanism 2 shown in FIG. 2 and is, for this reason, operative similarly to the system described with reference to FIG. 2.

Figure 5:
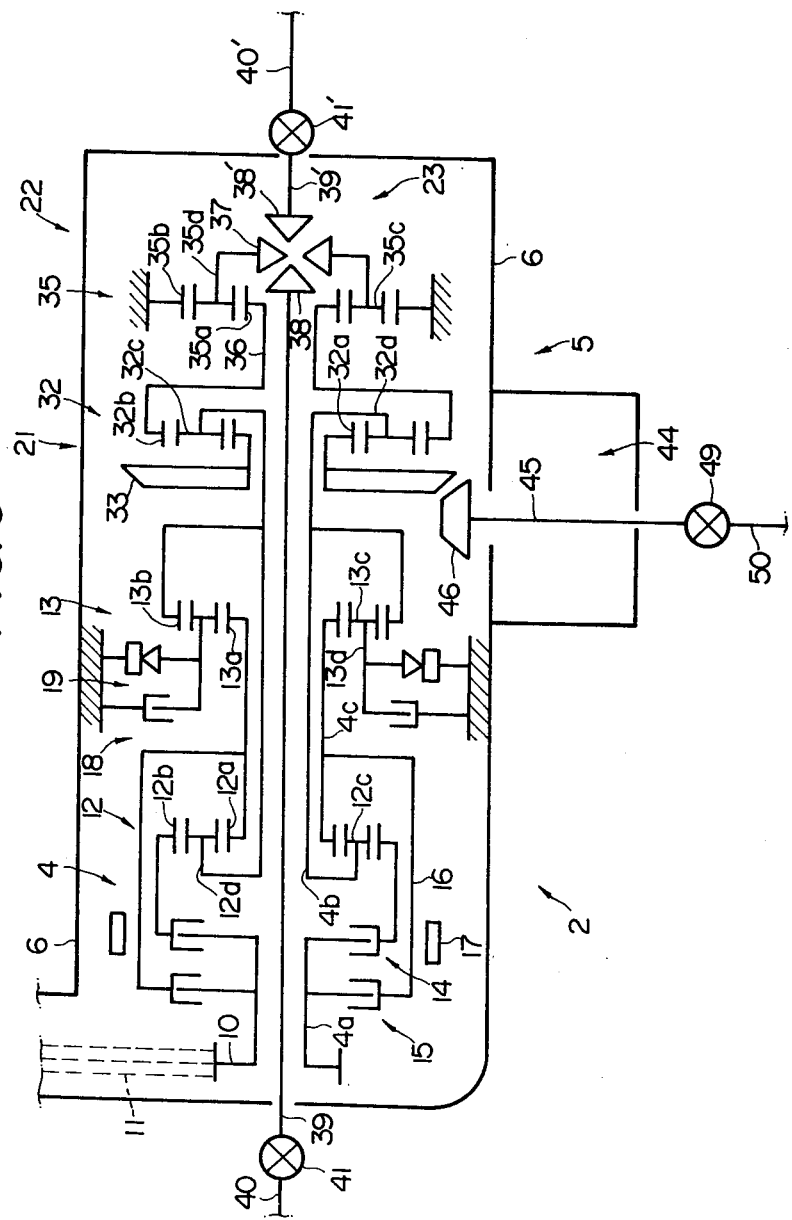
FIG. 5 is a schematic view showing the front-wheel drive gear unit forming part of a third preferred embodiment of a four-wheel drive system according to the present invention.

The transaxle mechanism 2 of the embodiment of a four-wheel drive system according to the present invention as shown in FIG. 5 of the drawings is characterized by omission of the low-and-high speed shift means 20 from the front-wheel drive gear unit 5. Thus, the pinion carrier 32d serving as the input member of the differential-action planetary gear assembly 32 in the embodiment shown in FIG. 5 is connected direct to and rotatable with the axial extension of the transmission output shaft 4b. As in the transaxle mechanism 2 shown in FIG. 2, the sun gear 32a and the ring gear 32b serving as the output members of the differential-action planetary gear assembly 32 are respectively connected to and rotatable with the driving power transfer bevel gear 33 and the sun gear 35a of the final-reduction planetary gear assembly 35. In the absence of the low-and-high speed shift means 20 in the front-wheel drive gear unit 5, the driving power transmitted to the transmission output shaft 4b is carried direct to the pinion carrier 32d of the power splitting planetary gear assembly 32 so that the pinion carrier 32d or the input member of the planetary gear assembly 32 is driven for rotation at a speed equal to the speed of rotation of the transmission output shaft 4b. The four-wheel drive system including the transaxle mechanism 2 shown in FIG. 5 is in other respects similar in construction and arrangement to the embodiment shown in FIG. 2 and is, accordingly, operative similarly to the system described with reference to FIG. 2.

Figure 6:
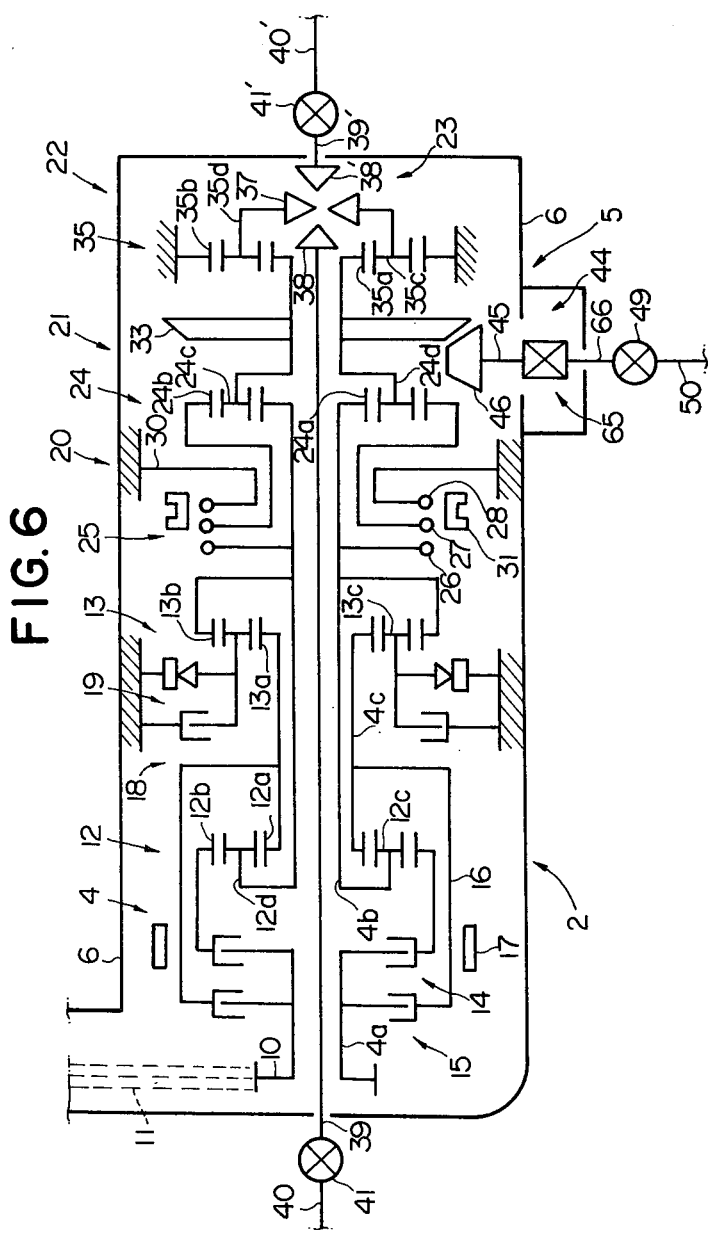
FIG. 6 is a schematic view showing the front-wheel drive gear unit forming part of a fourth preferred embodiment of a four-wheel drive system according to the present invention.

On the other hand, the transaxle mechanism 2 of the embodiment of a four-wheel drive system according to the present invention as shown in FIG. 6 features omission of a planetary gear assembly from the power splitting gear means 21. The power splitting gear means 21 of the front-wheel drive gear unit 5 in the transaxle mechanism 2 herein shown is, thus, constituted solely by the driving power transfer bevel gear 33 which is securely connected to and coaxially rotatable with the pinion carrier 24d serving as the output member in the planetary gear assembly 24 of the low-and-high speed shift means 20 and the sun gear 35a serving as the input member of the final-reduction planetary gear assembly 35. As a consequence, the driving power delivered from the pinion carrier 24d of the planetary gear assembly 24 is directly transmitted in part to the sun gear 35a of the final-reduction planetary gear assembly 35 and in part to the driving power transfer bevel gear 33. The driving power transfer bevel gear 33 is for this reason driven for rotation at a speed equal to the speed at which the sun gear 35a of the planetary gear assembly 35 is driven for rotation by the pinion carrier 24d of the planetary gear assembly 24. The power splitting gear means 21 in the front-wheel drive gear unit 5 of the transaxle mechanism shown in FIG. 6 is thus devoid of a differential action producing a differential speed of rotation between the driving power transfer bevel gear 33 and the sun gear 35a of the planetary gear assembly 35. To provide a shifting action between the power transfer gear means 44 and the rear-wheel driveline in the four-wheel drive system thus constructed and arranged, suitable two-wheel/four-wheel drive shift clutch means may be provided therebetween as schematically indicated at 65. The four-wheel drive system including the transaxle mechanism 2 shown in FIG. 6 is in other respects similar in construction and arrangement to the embodiment shown in FIG. 2 and is, accordingly, operative similarly to the system described with reference to FIG. 2.

Figure 7:
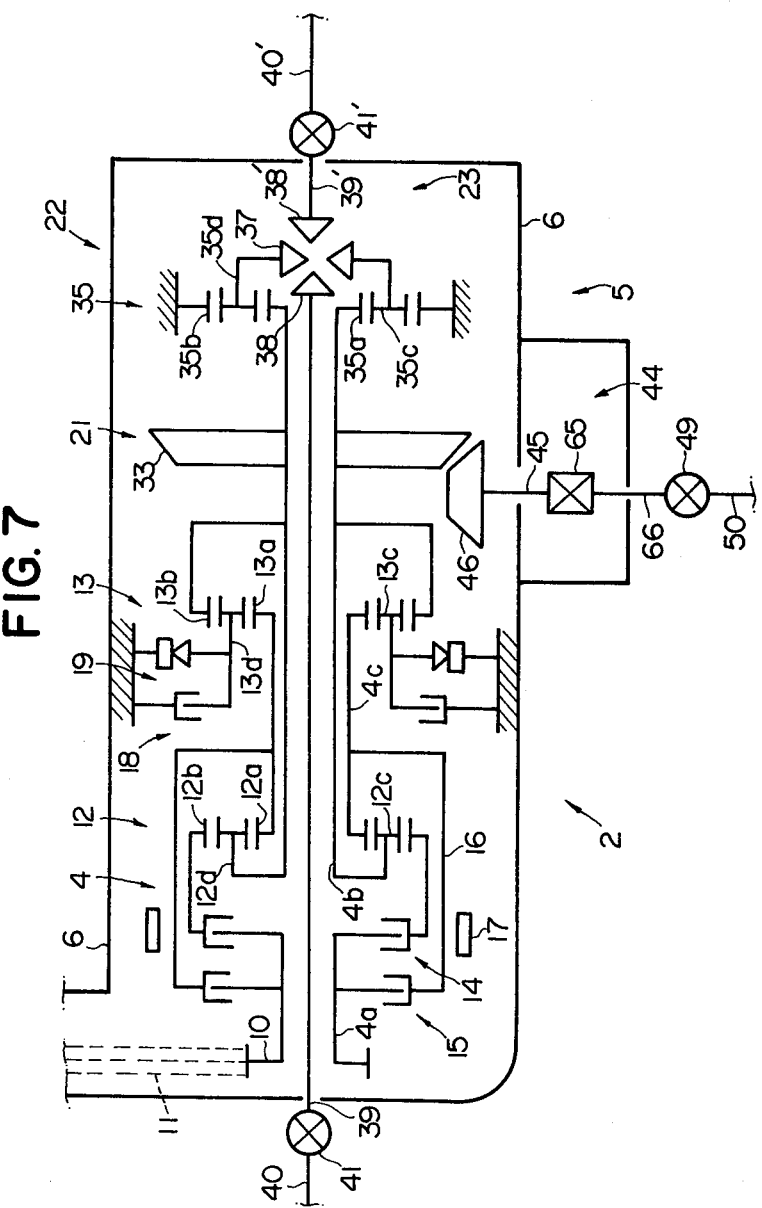
FIG. 7 is a schematic view showing the front-wheel drive gear unit forming part of a fifth preferred embodiment of a four-wheel drive system according to the present invention.

Furthermore, the transaxle mechanism 2 of the embodiment of a four-wheel drive system according to the present invention as shown in FIG. 7 of the drawings is characterized by omission of the low-and-high speed shift means 20 from the front-wheel drive gear unit 5 and a planetary gear assembly from the power splitting gear means 21. The power splitting gear means 21 of the front-wheel drive gear unit 5 in the transaxle mechanism shown in FIG. 7 is, thus, constituted solely by the driving power transfer bevel gear 33 which is securely connected to and coaxially rotatable with the transmission output shaft 4b and the sun gear 35a or input member of the planetary gear assembly 35 of the final-reduction planetary gear assembly 35. As a consequence, the driving power delivered from the transmission output shaft 4b is directly transmitted in part to the sun gear 35a of the final-reduction planetary gear assembly 35 and in part to the driving power transfer bevel gear 33. The driving power transfer bevel gear 33 in the transaxle mechanism 2 shown in FIG. 7 is for this reason also driven for rotation at a speed equal to the speed at which the sun gear 35a of the planetary gear assembly 35 is driven for rotation by the transmission output shaft 4b. The power splitting gear means 21 in the front-wheel drive gear unit 5 of the embodiment of FIG. 7 is thus devoid of a differential action producing a differential speed of rotation between the driving power transfer bevel gear 33 and the sun gear 35a of the planetary gear assembly 35. The four-wheel drive system using the transaxle mechanism 2 herein shown may also be provided with suitable two-wheel/four-wheel drive shift clutch means arranged between the power transfer gear means 44 and the rear-wheel driveline as schematically indicated at 65. The four-wheel drive system shown in FIG. 7 is also in other respects similar in construction and arrangement to the embodiment shown in FIG. 2 and is, accordingly, operative similarly to the system described with reference to FIG. 2.

Figure 8:
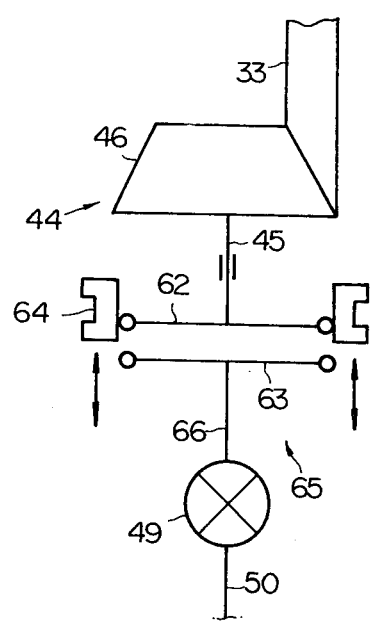
FIG. 8 is a schematic view showing an example of the construction and arrangement of the two-wheel/four-wheel drive shift clutch means included in each of the embodiments shown in FIGS. 6 and 7.

An example of the arrangement of the two-wheel/four-wheel drive shift clutch means provided in the transaxle mechanism 2 in each of the arrangements shown in FIGS. 6 and 7 is shown in FIG. 8. In the rear-wheel driveline of the four-wheel drive system having the two-wheel/four-wheel drive shift clutch means provided therein, the propeller shaft 50 is separate from the power transfer shaft 45 of the power transfer gear means 44. Thus, the rear-wheel driveline comprises a drive shaft 66 axially aligned with and intervening between the power transfer shaft 45 and the propeller shaft 50 and connected to the propeller shaft 50 across the previously mentioned universal joint 49 as shown. The two-wheel/four-wheel drive shaft clutch means 65 thus arranged comprises a first externally serrated clutch element 62 coaxially rotatable with the power transfer shaft 45, and a second clutch element 63 coaxially rotatable with the drive shaft 66. One of the first and second clutch elements such as the first clutch element 62 is engaged by an internally serrated coupling element 64 which is axially slidable on the clutch element 62 selectively into and out of engagement with the second clutch element 63. The driven power transfer bevel gear 46 of the power transfer gear means 44 is, thus, drivingly connected to and disconnected from the rear-wheel driveline depending upon the axial position of the coupling element 64 with respect to each of the first and second clutch elements 62 and 63. The arrangement of the two-wheel/four-wheel drive shift clutch means as above described is simply by way of example and may therefore be modified and/or changed in any desired manner.

From the foregoing description, it will have been appreciated that the four-wheel drive system according to the present invention is characterized in that the four-wheel drive system can be readily modified from a driving system for a two-wheel-driven vehicle. The simplest form of embodiment of the system as shown in FIG. 7, for example, may be modified from a two-wheel drive system simply by connecting the driving power transfer bevel gear 33 to the transmission output shaft of the two-wheel drive system and having the power transfer gear means 44 arranged so that the driven power transfer bevel gear 46 thereof is held in mesh with the driving power transfer bevel gear 33. The four-wheel drive system according to the present invention is further characterized in that the position of the propeller shaft 50 in a lateral direction of the vehicle body can be selected arbitarily by varying the axial length of the power transfer shaft 45 of the power transfer gear means 44. The rear-wheel driveline of the four-wheel drive system according to the present invention can be constructed and arranged without having recourse to strict design consideration which would otherwise be required to have the propeller shaft arranged in such a manner that would not interfere with any members and units connected to the vehicle body, such as the exhaust pipe of the engine.

While the present invention has been described as using an automatic three-forward-speed and one-reverse speed transmission gear unit, it will be apparent that the four-wheel drive system according to the present invention may use a manual transmission gear unit or an automatic transmission gear unit of another type. Although, furthermore, it has been assumed that the power unit in each of the embodiments hereinbefore described in constituted by an internal combustion engine positioned at the front of a vehicle, this is merely by way of example and, thus, the power unit of the drive system according to the present invention may be constituted by any other type of power unit and may be positioned at the rear of a vehicle or installed in a vehicle of the midship type.

What is claimed is:

1. A four-wheel drive system for a vehicle having at least two pairs of road wheels consisting of a pair of front road wheels and a pair of rear road wheels, comprising a power unit having an output shaft rotatable about an axis in a lateral direction of the vehicle;

a power transmission gear unit including transmission input and output shafts each having an axis of rotation substantially parallel with the axis of rotation of the output shaft of the power unit, and gears connected to the transmission input and output shafts and arranged to be capable of selectively producing a plurality of ratios between the speeds of rotation of the transmission input and output shaft;

a first wheel drive gear unit comprising power splitting gear means operative to split driving power from said transmission output shaft into first and second driving power components, and a first differential gear assembly including gears arranged to split the first driving power component into two output power components to be respectively transmitted to one of said two pairs of road wheels, said power splitting gear means and the first differential gear assembly being positioned substantially in alignment with said transmission output shaft in a lateral direction of the vehicle; and a second wheel drive gear unit comprising a second differential gear assembly including gears arranged to split the second driving power component into two output power components to be respectively transmitted to the other of said two pairs of road wheels;

wherein said first wheel drive gear unit further comprises final reduction gear means positioned axially between said power splitting gear means and said first differential gear assembly, and power transfer gear means intervening between said power splitting gear means and said second wheel drive gear unit and operative to transmit therethrough said second driving power component to said second differential gear assembly, said power splitting gear means comprising a driving power transfer bevel gear rotatable about an axis substantially aligned with the axis of rotation of the transmission output shaft, said power transfer gear means comprising a driven power transfer bevel gear which is rotatable about an axis in a fore-and-aft direction of the vehicle body and which is held in mesh with the driving power transfer bevel gear.

2. A four-wheel drive system as set forth in claim 1, in which said final reduction gear means comprises a final-reduction planetary gear assembly including an externally toothed sun gear rotatable about an axis substantially aligned with the axis of rotation of the transmission output shaft, an internally toothed ring gear coaxially encircling the sun gear and rotatable about the axis of rotation of the sun gear, at least two planet pinions each held in mesh with the sun gear and the ring gear and rotatable about an axis of rotation substantially parallel with the axis of rotation of the sun gear, and a pinion carrier interconnecting the planet pinions together and rotatable about the common axis of rotation of the sun gear and the ring gear, said planetary gear assembly having an input member constituted by one of said sun gear, said ring gear and said pinion carrier and an output member constituted by one of the remaining two of the sun gear, ring gear and pinion carrier, said transmission output shaft being held in driving engagement with said input member, said output member being held in driving connection to said first differential gear assembly.

3. A four-wheel drive system as set forth in claim 2, in which said first wheel drive gear unit further comprises a stationary member fixed in the vehicle and a low-and-high speed shift means which intervenes axially between said power transmission gear unit and said power splitting gear means and which comprises (1) a speed-shift planetary gear assembly including an externally toothed sun gear rotatable about an axis substantially aligned with the axis of rotation of the transmission output shaft, an internally toothed ring gear coaxially encircling the sun gear and rotatable about the axis of rotation of the gun gear, at least two planet pinions each held in mesh with the sun gear and the ring gear and rotatable about an axis of rotation substantially parallel with the axis of rotation of the sun gear, and a pinion carrier interconnecting the planet pinions together and rotatable about the common axis of rotation of the sun gear and the ring gear, said speed-shift planetary gear assembly having a constant input member coaxially rotatable with said transmission output shaft, a lockable input member coaxially rotatable around the transmission output shaft and an output member held in driving engagement with the input member of said final-reduction planetary gear assembly and constituted by one of the sun gear, ring gear and pinion carrier of the speed-shift planetary gear assembly, the constant and lockable input members being respectively constituted by the remaining two of the sun gear, ring gear and pinion carrier of the speed-shift planetary gear assembly, and (2) clutch means operative to provide coupling selectively between said constant and lockable input members and between the lockable input member and said stationary member.

4. A four-wheel drive system as set forth in claim 3, in which said clutch means comprises a first clutch member rotatable with said constant input member, a second clutch member rotatable with said lockable input member, a third clutch member secured to said stationary member, and a coupling member rotatable with said second clutch member and selectively movable into and out of engagement with each of the first and third clutch members.

5. A four-wheel drive system as set forth in claim 1 or 2, in which said power splitting gear means further comprises a differential-action planetary gear asssmebly including an externally toothed sun gear rotatable about an axis substantially aligned with the axis of rotation of the transmission output shaft, an internally toothed ring gear coaxially encircling the sun gear and rotatable about the axis of rotation of the sun gear, at least two planet pinions each held in mesh with the sun gear and the ring gear and rotatable about an axis of rotation substantially parallel with the axis of rotation of the sun gear, and a pinion carrier interconnecting the planet pinions together and rotatable about the common axis of rotation of the sun gear and the ring gear, said differential-action planetary gear assembly having an input member constituted by one of said sun gear, said ring gear and said pinion carrier thereof and two output members respectively constituted by the remaining two of the sun gear, ring gear and pinion carrier thereof, said transmission output shaft being held in driving engagement with said input member of the differential-action planetary gear assembly, one of said output members of the differential-action planetary gear assembly being held in driving connection to the input member of said final-reduction planetary gear assembly and the other of said input members being held in driving connection to said driving power transfer bevel gear.

6. A four-wheel drive system as set forth in claim 5, in which said first wheel drive gear unit further comprises a stationary member fixed in the vehicle and a low-and-high speed shift means which intervenes axially between said power transmission gear unit and said power splitting gear means and which comprises (1) a speed-shift planetary gear assembly including an externally toothed sun gear rotatable about an axis substantially aligned with the axis of rotation of the transmission output shaft, an internally toothed ring gear coaxially encircling the sun gear and rotatable about the axis of rotation of the sun gear, at least two planet pinions each held in mesh with the sun gear and the ring gear and rotatable about an axis of rotation substantially parallel with the axis of rotation of the sun gear, and a pinion carrier interconnecting the planet pinions together and rotatable about the common axis of rotation of the sun gear and the ring gear, said speed-shift planetary gear assembly having a constant input member coaxially rotatable with said transmission output shaft, a lockable input member coaxially rotatable on the transmission output shaft and an output member held in driving engagement with the input member of said differential-action planetary gear assembly and constituted by one of the sun gear, ring gear and pinion carrier of the speed-shift planetary gear assembly, the constant and lockable input members being respectively constituted by the remaining two of the sun gear, ring gear and pinion carrier of the speed-shift planetary gear assembly, and (2) clutch means operative to provide coupling selectively between said constant and lockable input members and between the lockable input member and said stationary member.

7. A four-wheel drive system as set forth in claim 6, in which said clutch means comprises a first clutch member rotatable with said constant input member, a second clutch member rotatable with said lockable input member, a third clutch member secured to said stationary member, and a coupling member rotatable with said second clutch member and selectively movable into and out of engagement with each of the first and third clutch members.

8. A four-wheel drive system as set forth in claim 4, in which said constant and lockable input members of the speed-shift planetary gear assembly are constituted by the pinion carrier and the ring gear, respectively, of the speed-shift planetary gear assembly.

9. A four-wheel drive system as set forth in claim 4, in which said constant and lockable input members of the speed-shift planetary gear assembly is constituted by the sun gear and the ring gear, respectively, of the speed-shift planetary gear assembly.

10. A four-wheel drive system as set forth in claim 5, in which said driving power transfer bevel gear is located axially adjacent to and substantially in alignment with said differential-action planetary gear assembly.

11. A four-wheel drive system as set forth in claim 5, in which one of said two output members of the differential-action planetary gear assembly is constituted by the sun gear of said differential-action planetary gear assembly and is secured to and rotatable with said driving power transfer bevel gear and the other of the two output members is constituted by the ring gear of the differential-action planetary gear assembly and is held in driving engagement with the input member of said final-reduction planetary gear assembly.

12. A four-wheel drive system as set forth in claim 5, in which one of said two output members of the differential-action planetary gear assembly is constituted by the ring gear of said differential-action planetary gear assembly and is secured to and rotatable with said driving power transfer bevel gear and in which the other of the two output members is constituted by the sun gear of the differential-action planetary gear assembly and is held in driving engagement with the input member of said final-reduction planetary gear assembly.

13. A four-wheel drive system as set forth in claim 12, in which said driving power transfer bevel gear is integral with said ring gear of the differential-action planetary gear assembly.

14. A four-wheel drive system as set forth in claim 3 or 4, in which said driving power transfer bevel gear is secured to and coaxially rotatable with the output member of said speed-shift planetary gear assembly and the input member of said final-reduction planetary gear assembly.

15. A four-wheel drive system as set forth in claim 1 or 2, in which said driving power transfer bevel gear is secured to and coaxially rotatable with said transmission output shaft.

16. A four-wheel drive system as set forth in claim 1, 2, 3 or 4, further comprising two-wheel/four-wheel drive shift clutch means intervening between said power transfer gear means and said second wheel drive gear unit and operative to selectively provide and interrupt driving connection from the power transfer gear means to the second wheel drive gear unit.

17. A four-wheel drive system as set forth in claim 6, in which said constant and lockable input members of the speed-shift planetary gear assembly are constituted by the pinion carrier and the ring gear, respectively, of the speed-shift planetary gear assembly.

18. A four-wheel drive system as set forth in claim 7, in which said constant and lockable input members of the speed-shift planetary gear assembly are constituted by the pinion carrier and the ring gear, respectively, of the speed-shift planetary gear assembly.

19. A four-wheel drive system as set forth in claim 6, in which said constant and lockable input members of the speed-shift planetary gear assembly is constituted by the sun gear and the ring gear, respectively, of the speed-shift planetary gear assembly.

20. A four-wheel drive system as set forth in claim 7, in which said constant and lockable input members of the speed-shift planetary gear assembly is constituted by the sun gear and the ring gear, respectively, of the speed-shift planetary gear assembly.

21. A four-wheel drive system as set forth in claim 6, in which said driving power transfer bevel gear is located axially adjacent to and substantially in alignment with said differential-action planetary gear assembly.

22. A four-wheel drive system as set forth in claim 7, in which said driving power transfer bevel gear is located axially adjacent to and substantially in alignment with said differential-action planetary gear assembly.

23. A four-wheel drive system as set forth in claim 6, in which one of said two output members of the differential-action planetary gear assembly is constituted by the sun gear of said differential-action planetary gear assembly and is secured to and rotatable with said driving power transfer bevel gear and the other of the two output members is constituted by the ring gear of the differential-action planetary gear assembly and is held in driving engagement with the input member of said final-reduction planetary gear assembly.

24. A four-wheel drive system as set forth in claim 7, in which one of said two output members of the differential-action planetary gear assembly is constituted by the sun gear of said differential-action planetary gear assembly and is secured to and rotatable with said driving power transfer bevel gear and the other of the two output members is constituted by the ring gear of the differential-action planetary gear assembly and is held in driving engagement with the input member of said final-reduction planetary gear assembly.

25. A four-wheel drive system as set forth in claim 6, in which one of said two output members of the differential-action planetary gear assembly is constituted by the ring gear of said differential-action planetary gear assembly and is secured to and rotatable with said driving power transfer bevel gear and in which the other of the two output members is constituted by the sun gear of the differential-action planetary gear assembly and is held in driving engagement with the input member of said final-reduction planetary gear assembly.

26. A four-wheel drive system as set forth in claim 25, in which said driving power transfer bevel gear is integral with said ring gear of the differential-action planetary gear assembly.

27. A four-wheel drive system as set forth in claim 7, in which one of said two output members of the differential-action planetary gear assembly is constituted by the ring gear of said differential-action planetary gear assembly and is secured to and rotatable with said driving power transfer bevel gear and in which the other of the two output members is constituted by the sun gear of the differential-action planetary gear assembly and is held in driving engagement with the input member of said final-reduction planetary gear assembly.

28. A four-wheel drive system as set forth in claim 27, in which said driving power transfer bevel gear is integral with said ring gear of the differentialaction planetary gear assembly.

* * * * *